United States Patent
Moon et al.

(10) Patent No.: US 9,726,758 B2
(45) Date of Patent: Aug. 8, 2017

(54) APPARATUS AND METHOD FOR DETECTING TARGET USING RADAR

(71) Applicant: HYUNDAI MOBIS CO., LTD., Seoul (KR)

(72) Inventors: Sung Hoon Moon, Yongin (KR); Hee Deok Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 498 days.

(21) Appl. No.: 14/312,615

(22) Filed: Jun. 23, 2014

(65) Prior Publication Data

US 2015/0338513 A1    Nov. 26, 2015

(30) Foreign Application Priority Data

May 20, 2014    (KR) ........................ 10-2014-0060223

(51) Int. Cl.
*G01S 7/292*    (2006.01)
*G01S 13/52*    (2006.01)
(Continued)

(52) U.S. Cl.
CPC ................ *G01S 13/04* (2013.01); *G01S 7/02* (2013.01); *G01S 7/2923* (2013.01);
(Continued)

(58) Field of Classification Search
CPC ................ G01S 13/04; G01S 13/5246; G01S 7/292–7/2927; G01S 13/0209;
(Continued)

(56) References Cited

U.S. PATENT DOCUMENTS 3,699,573 A * 10/1972 Andrews ................. G01S 13/72
                                                    342/189
4,089,002 A *  5/1978 Kerr ....................... G01S 7/2923
                                                    342/135
(Continued)

FOREIGN PATENT DOCUMENTS

KR    10-1109150 B1    2/2012
KR    101109150 B1 *  2/2012
(Continued)

OTHER PUBLICATIONS

Ordered Statistic CFAR Techinique—an Overview, (2011), Hermann Rohling, pp. 1-8.*

(Continued)

*Primary Examiner* — Peter Bythrow

(57) ABSTRACT

The present invention suggests a target detecting apparatus and method using a radar which detect a target using a recursive modified cell average-constant false alarm rate (RMCA-CFAR) detector without having a sorting process. The present invention provides a target detecting apparatus using a radar, the apparatus including: a data selecting unit which compares reference data with at least one of previous data and subsequent data which are located at both sides of the reference data, from a received signal including information on a distance and a speed for multiple targets, to select specific data; a cell average calculating unit which calculates an average of cells extracted using a sliding window including the specific data; a CFAR data detecting unit which detects CFAR data based on the average of the extracted cells; and a target detecting unit which detects the target based on the CFAR data.

16 Claims, 7 Drawing Sheets

(51) Int. Cl.
G01S 13/04 (2006.01)
G01S 13/93 (2006.01)
G01S 13/524 (2006.01)
G01S 7/02 (2006.01)
G01S 13/02 (2006.01)

(52) U.S. Cl.
CPC ........ G01S 7/2927 (2013.01); G01S 13/0209 (2013.01); G01S 13/5244 (2013.01); G01S 13/5246 (2013.01); G01S 13/931 (2013.01)

(58) Field of Classification Search
CPC .......... G01S 7/02; G01S 13/931; G01S 13/52; G01S 13/5244
USPC .......................................................... 342/27
See application file for complete search history.

(56) References Cited

U.S. PATENT DOCUMENTS

| | | | | |
|---|---|---|---|---|
| 4,845,500 A * | 7/1989 | Cornett | ................... | G01S 13/72 342/139 |
| 5,179,712 A * | 1/1993 | Abboud | ................ | G01S 7/2922 340/146.2 |
| 5,287,114 A * | 2/1994 | Desodt | ................. | G01S 7/2927 342/91 |
| 5,416,488 A * | 5/1995 | Grover | .................. | G01S 7/2927 342/109 |
| 5,457,462 A * | 10/1995 | Mitsumoto | ......... | G01S 13/5246 342/194 |
| 5,508,706 A * | 4/1996 | Tsou | .................... | B60Q 1/0023 342/110 |
| 5,546,089 A * | 8/1996 | Talbot | ................... | G01S 7/2927 342/159 |
| 5,703,592 A * | 12/1997 | Watts | .................... | G01S 7/2927 342/159 |
| 5,748,142 A * | 5/1998 | Rademacher | ........... | G01S 7/023 342/159 |
| 5,798,728 A * | 8/1998 | Tomishima | ........... | G01S 7/2927 342/159 |
| 5,808,579 A * | 9/1998 | Rademacher | ........... | G01S 7/295 342/159 |
| 6,011,507 A * | 1/2000 | Curran | .................... | G01S 7/354 342/70 |
| 6,188,350 B1 * | 2/2001 | Neumerkel | ............... | G01D 1/14 342/104 |
| 6,822,606 B2 * | 11/2004 | Ponsford | ................... | G01S 3/74 342/159 |
| 8,013,781 B2 * | 9/2011 | Stockmann | ........... | G01S 7/2923 342/159 |
| 2003/0085834 A1 * | 5/2003 | Okamura | ............. | G01S 7/2923 342/70 |
| 2003/0174088 A1 * | 9/2003 | Dizaji | .................... | G01S 7/2927 342/93 |
| 2007/0027583 A1 * | 2/2007 | Tamir | ................. | G06Q 30/0283 701/1 |
| 2007/0076917 A1 * | 4/2007 | Chen | .................... | G06K 9/3241 382/103 |
| 2008/0111731 A1 * | 5/2008 | Hubbard | ............. | G01S 13/5246 342/160 |
| 2009/0315757 A1 * | 12/2009 | Watts | ..................... | G01S 7/2927 342/93 |
| 2010/0073218 A1 * | 3/2010 | Stockmann | ......... | G01S 13/5248 342/146 |
| 2010/0141504 A1 * | 6/2010 | Szajnowski | ............... | G01S 7/35 342/85 |
| 2013/0169473 A1 * | 7/2013 | Gallone | .................. | G01S 7/354 342/159 |
| 2013/0201054 A1 * | 8/2013 | Wang | ................. | G01S 13/0218 342/93 |
| 2013/0321195 A1 * | 12/2013 | Moriuchi | ................ | G01S 13/52 342/70 |
| 2016/0061946 A1 * | 3/2016 | Wallace | ............. | G01S 13/5242 342/161 |
| 2016/0245911 A1 * | 8/2016 | Wang | ..................... | G01S 13/72 |

FOREIGN PATENT DOCUMENTS

KR 10-1188301 B1 10/2012
KR 101188301 B1 * 10/2012
WO WO 2008085223 A2 * 7/2008 .......... G01S 13/5246

OTHER PUBLICATIONS

Hermann Rohling, "Ordered Statistic CFAR Technique—an Overview", Hamburg University of Technology, Sep. 7-9, 2011, pp. 1-8.

* cited by examiner

[FIG. 1]
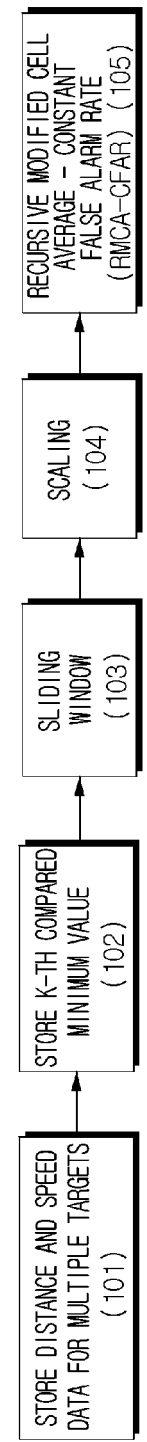

[FIG. 2]
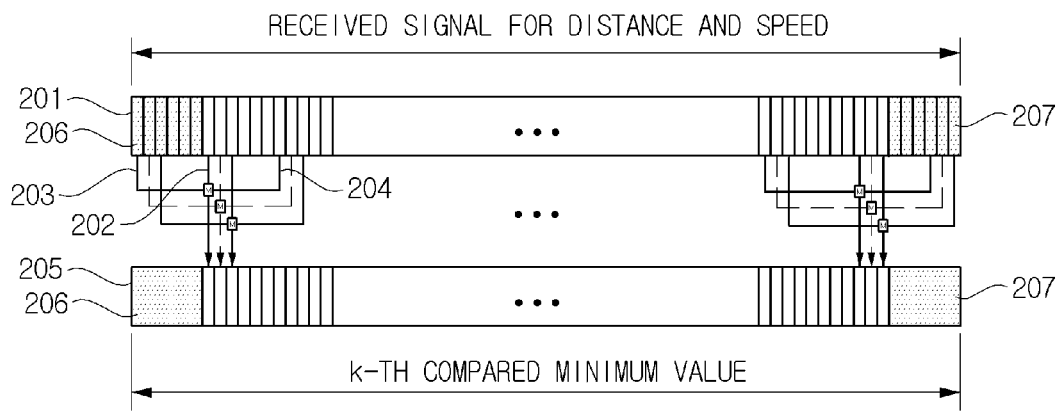
[FIG. 3]
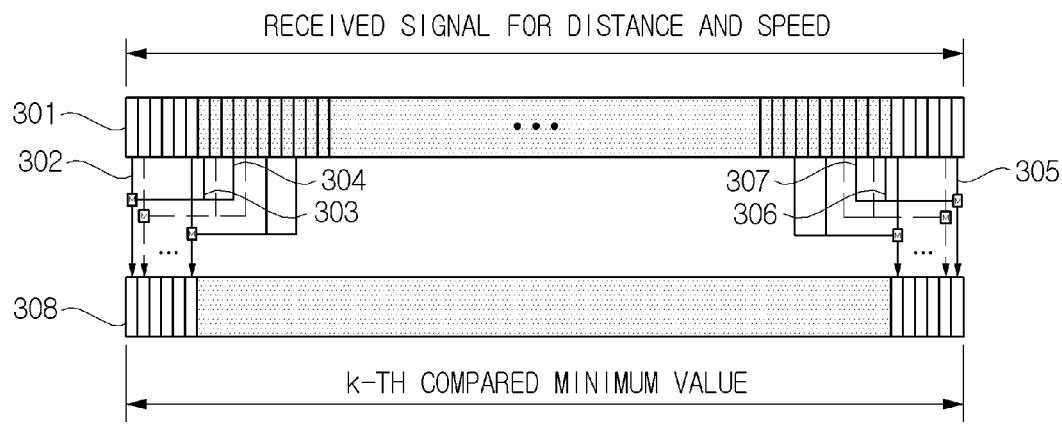

[FIG. 4]
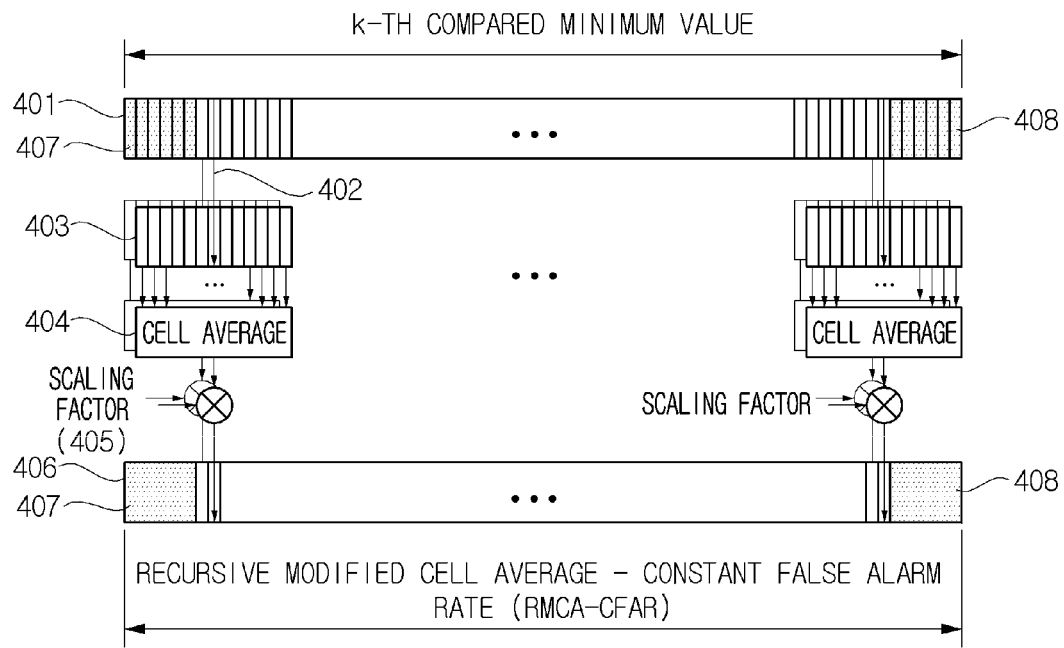
[FIG. 5]
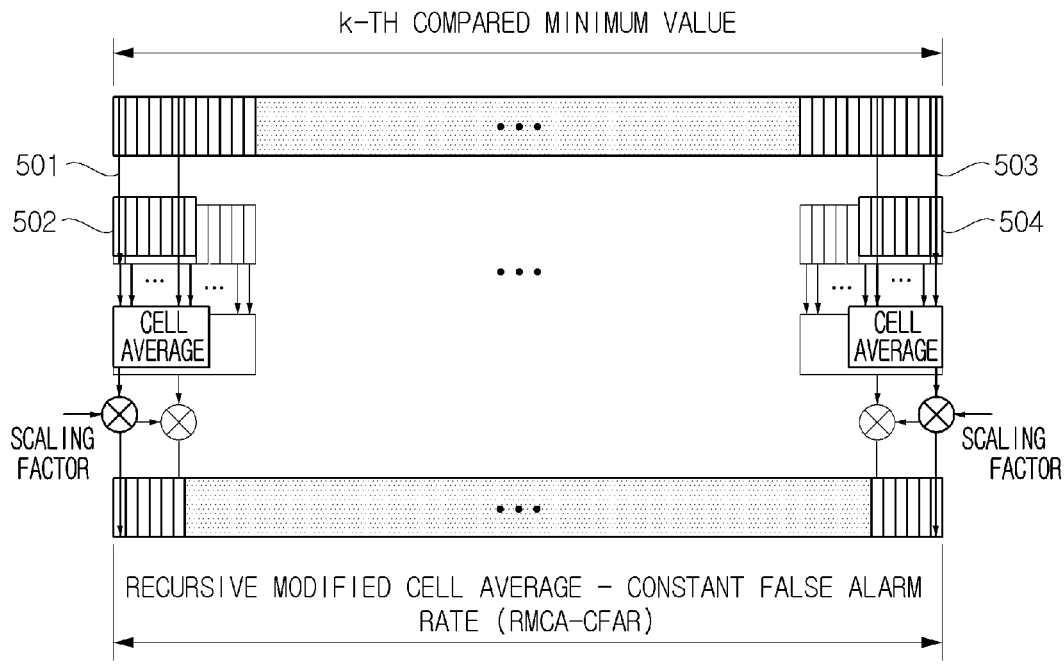

[FIG. 6]
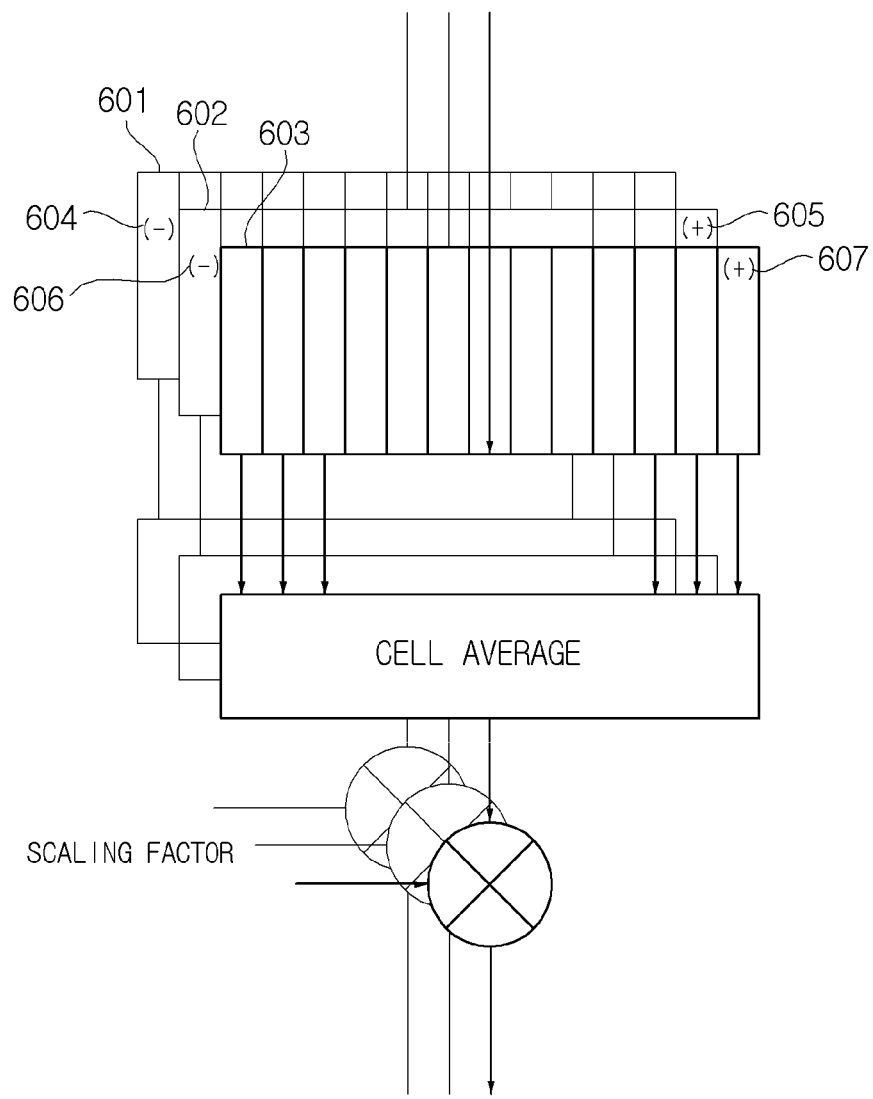

[FIG. 7]
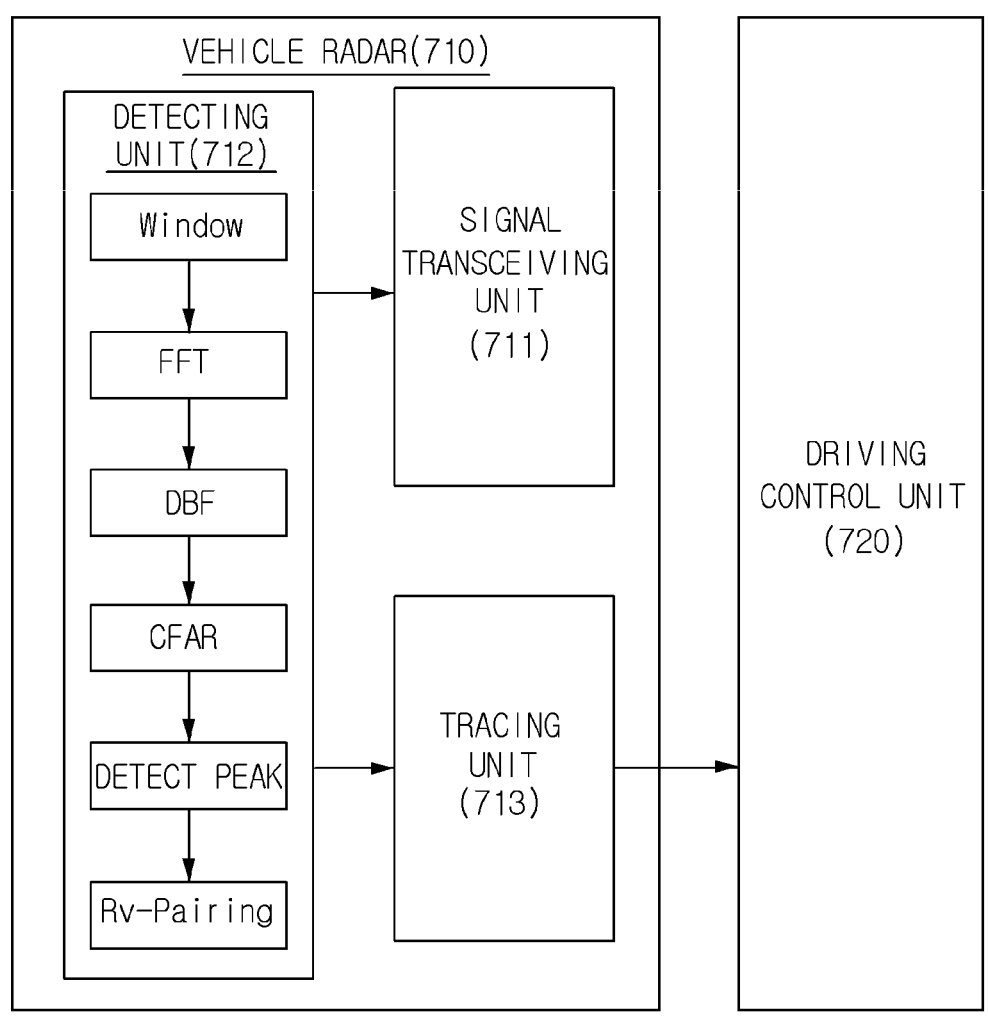

[FIG. 8]
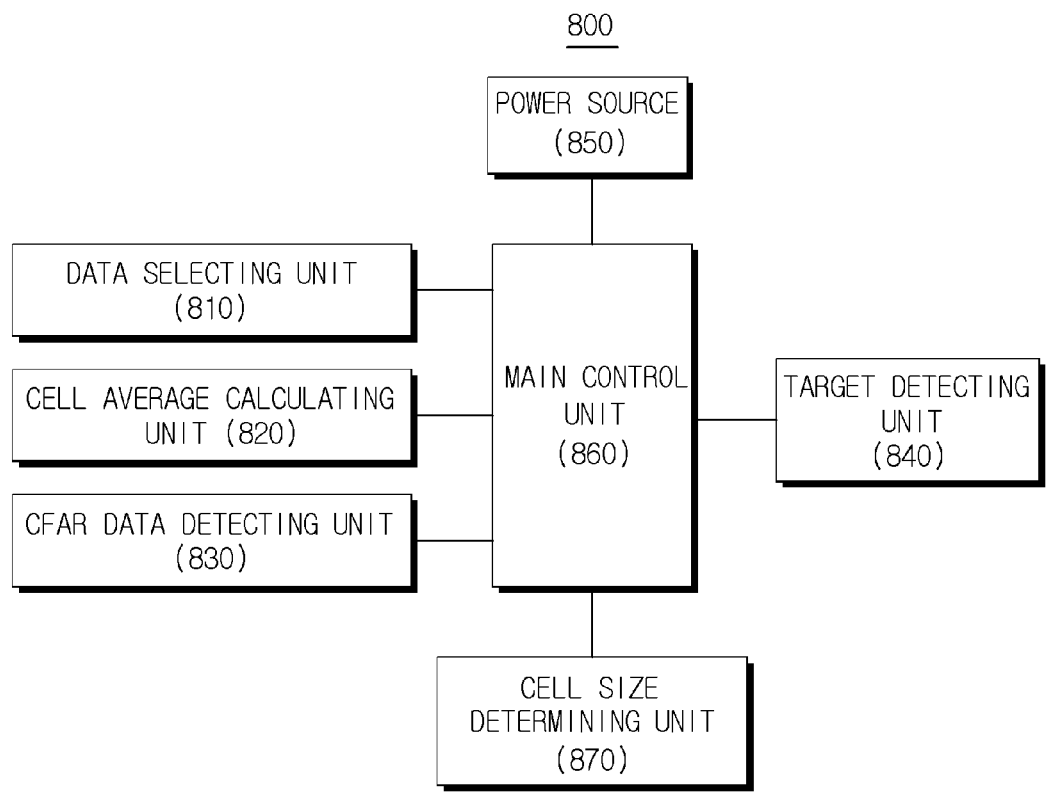

[FIG. 9]
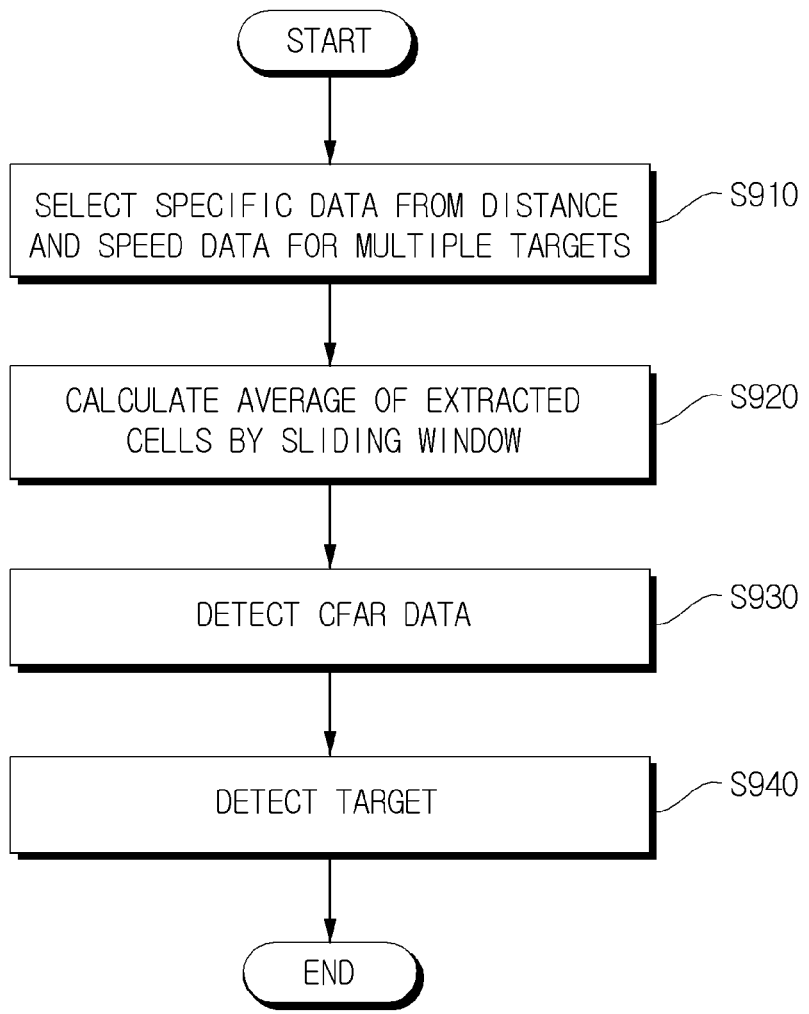

APPARATUS AND METHOD FOR DETECTING TARGET USING RADAR

CROSS-REFERENCE TO RELATED APPLICATIONS

This application claims priority to and the benefit of Korean Patent Application No. 10-2014-0060223 filed in the Korean Intellectual Property Office on May 20, 2014, the entire contents of which are incorporated herein by reference.

TECHNICAL FIELD

The present invention relates to an apparatus and method for detecting a target using a radar and more particularly, to an apparatus and method for detecting a target using a vehicle radar which is mounted in a vehicle.

BACKGROUND ART

A radar is a device which determines information such as a distance, a speed, or an angle of a target. That is, the radar radiates an electromagnetic wave signal through a transmission antenna to receive a signal which is reflected and returns from the target through a reception antenna and uses the received signal to determine information on the target.

The radar technique was developed from a military and aviation field and recently applied to a vehicle as a technique which gives a warning in advance and actively prevents and avoids dangerous car accidents.

However, in vehicle radar environments, it is difficult to determine information on multiple targets in continuous cluttered environments such as a tunnel, a guard rail, or a building. In such cluttered environments, generally, an order statistics constant false alarm rate (OS-CFAR) detector is efficiently used to detect multiple targets. However, the OS-CFAR detector causes excessive operating time due to a sorting process.

Korean Patent No. 1,109,150 discloses a constant false alarm rate detecting method. Even though the detecting method is aimed at improving a computation amount, the detecting method basically follows an order statistic method so that it is difficult to achieve a rapid improvement of an operating speed.

SUMMARY OF THE INVENTION

The present invention has been made in an effort to provide an apparatus and method for detecting a target using a radar which detects a target using a recursive modified cell average-constant false alarm rate (RMCA-CFAR) detector in which a sorting process is not provided.

However, an object of the present invention is not limited to the above description and other objects which have not been mentioned above will be apparent to those skilled in the art from reading the following description.

An exemplary embodiment of the present invention provides a target detecting apparatus using a radar, including: a data selecting unit which compares reference data with at least one of previous data and subsequent data which are located at both sides of the reference data, from a received signal including information on a distance and a speed for multiple targets, to select specific data; a cell average calculating unit which calculates an average of extracted cells using a sliding window including the specific data, a CFAR data detecting unit which detects constant false alarm rate (CFAR) data based on the average of the extracted cells; and a target detecting unit which detects the target based on the CFAR data.

The data selecting unit may select data having a minimum value as the specific data.

When there is no previous data, the data selecting unit may compare the reference data with at least one of the subsequent data to select the specific data, when there is no subsequent data, compare the reference data with at least one of the previous data to select the specific data, and when there are the previous data and the subsequent data, compare the reference data, the previous data, and the subsequent data to select the specific data.

The cell average calculating unit may calculate the average of the extracted cells in accordance with the shift of the sliding window.

The target detecting apparatus may further include a cell size determining unit which determines a size of a cell which includes at least one of the previous data and the subsequent data and the reference data in accordance with the position of the sliding window.

The CFAR data detecting unit may multiply the average of the extracted cells by a predetermined factor to detect the CFAR data.

The target detecting unit may detect multiple targets using a vehicle radar in a cluttered environment.

The target detecting apparatus may be mounted in a vehicle.

Another exemplary embodiment of the present invention provides a target detecting method using a radar, including: comparing reference data with at least one of previous data and subsequent data which are located at both sides of the reference data, from a received signal including information on a distance and a speed for multiple targets, to select specific data; calculating an average of extracted cells using a sliding window including the specific data; detecting constant false alarm rate (CFAR) data based on the average of the extracted cells; and detecting the target based on the CFAR data.

The selecting may select data having a minimum value as the specific data.

In the selecting, when there is no previous data, the reference data is compared with at least one of the subsequent data to select the specific data, when there is no subsequent data, the reference data is compared with at least one of the previous data to select the specific data, and when there are the previous data and the subsequent data, the reference data, the previous data, and the subsequent data are compared to select the specific data.

In the calculating, the average of the extracted cells may be calculated in accordance with the shift of the sliding window.

The target detecting method may further include between the selecting and the calculating, determining a size of a cell which includes at least one of the previous data and the subsequent data and the reference data in accordance with the position of the sliding window.

The detecting of CFAR data may multiply the average of the extracted cells by a predetermined factor to detect the CFAR data.

The detecting of a target may detect multiple targets using a vehicle radar in a cluttered environment.

The present invention detects a target using a recursive modified cell average-constant false alarm rate (RMCA-CFAR) detector in which a sorting process is not provided to achieve effects as follows:

First, no sorting process is provided so that the operating speed may be rapidly improved and an operating time may be significantly shortened as compared with the related art.

Second, a target may be solidly detected in a continuous cluttered environment such as a tunnel, a guard rail, or a building.

Third, the target may be precisely detected even with hardware that has low performance.

Fourth, production cost may be saved from the viewpoint of hardware.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a conceptual view schematically illustrating a recursive modified cell average-constant false alarm rate (RMCA-CFAR) detector according to an exemplary embodiment of the present invention.

FIG. 2 is a referential view of a first exemplary embodiment which additionally explains steps 101 and 102 of FIG. 1.

FIG. 3 is a referential view of a second exemplary embodiment which additionally explains steps 101 and 102 of FIG. 1.

FIG. 4 is a referential view of a first exemplary embodiment which additionally explains steps 103 to 105 of FIG. 1.

FIG. 5 is a referential view of a second exemplary embodiment which additionally explains steps 103 to 105 of FIG. 1.

FIG. 6 is a referential view illustrating a recursive cell average calculating method.

FIG. 7 is a block diagram schematically illustrating an internal configuration of a vehicle to which a recursive modified cell average-constant false alarm rate detector according to an exemplary embodiment of the present invention is applied.

FIG. 8 is a block diagram schematically illustrating a target detecting apparatus using a radar according to an exemplary embodiment of the present invention.

FIG. 9 is a flowchart schematically illustrating a target detecting method using a radar according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. When reference numerals are denoted to the components of the drawings, even though the parts are illustrated in different drawings, it should be understood that like reference numbers refer to the same or equivalent parts of the present invention throughout the several figures of the drawing. When it is judged that specific description on known configurations or functions related in the description of the present invention may unnecessarily obscure the essentials of the present invention, the detailed description will be omitted. Hereinafter, exemplary embodiments of the present invention will be described. However, it should be understood that the technical spirit of the invention is not limited to the specific embodiments, but the specific embodiments may be changed or modified in various ways by those skilled in the art.

The present invention relates to a constant false alarm rate (CFAR) detector which is optimized in a vehicle radar and a method thereof and particularly, to a recursive modified cell average-constant false alarm rate (RMCA-CFAR) detector and a method thereof.

The detector according to an exemplary embodiment of the present invention has a rapid operating time without having a sorting process and solidly detects a target in a continuous cluttered environment such as a tunnel, a guard rail, or a building.

FIG. 1 is a conceptual view schematically illustrating a recursive modified cell average-constant false alarm rate (RMCA-CFAR) detector according to an exemplary embodiment of the present invention.

A recursive modified cell average-constant false alarm rate (RMCA-CFAR) detecting method according to an exemplary embodiment of the present invention includes a step 101 of, by a detector, converting a received signal which is reflected and returns from a target into distance and speed data for multiple targets through an algorism such as Window, FFT, or DBF and storing the data, a step 102 of, by the detector, comparing the signal with k-th left or right data of the stored data and storing minimum data, a sliding window step 103 of, by the detector, calculating the recursive average while the sliding window is shifted to the stored data, a step 103 of, by the detector, calculating a cell average, a scaling step 104 of, by the detector, multiplying the calculated cell average and a scaling factor, and a step 105 of, by the detector, storing the scaled data, that is, a recursive modified cell average-constant false alarm rate.

FIGS. 2 and 3 illustrate an exemplary embodiment of a method which compares the received signal stored for the distance and the speed with a k-th value to store a minimum value.

Referring to FIG. 2, the detector compares a current value 202 of the received signal 201 stored for the distance and speed with a left k-th value 203 and a right k-th value 204 to store a minimum value 205.

In a left marked section 206, there is no left k-th value and in a right marked section 207, there is no right k-th value so that the detector stores a minimum value through a method illustrated in FIG. 3.

FIG. 3 illustrates an exemplary embodiment of a method which stores a minimum value of the left marked section 206 and the right marked section 207.

Referring to FIG. 3, the detector stores a right k-th value 303 and a minimum value 308 of further right k-th values 304 for the signal 302 which does not have a left k value and a left k-th value 306 and a minimum value of further left k-th values 307 for the signal 305 which does not have a right k value.

FIGS. 4 and 5 illustrate an exemplary embodiment of a method which calculates a recursive average of a sliding window through the k-th compared minimum value and multiplies the recursive average and a scaling factor to obtain recursive modified cell average-constant false alarm rate data.

The detector calculates an average 404 of a window cell 403 having a predetermined size with respect to the stored k-th compared minimum value 402 and stores the recursive modified cell average-constant false alarm rate data by multiplying the scaling factor 405 and the average 404, as illustrated in FIG. 4. The detector calculates overall data of the recursive modified cell average-constant false alarm rate while shifting the window cell 403 to the right.

More detailed description thereof will be made below with reference to FIG. 6. FIG. 6 is a referential view illustrating a recursive cell average calculating method.

The detector reduces an operating speed through a recursive cell average method as illustrated in FIG. 6. When an initial window cell 601 of FIG. 6 is shifted to the right 602, last data 605 of the shifted window cell 602 is added except the first data 604 of the initial window cell 601. The window cell is shifted to the right 603 again and last data 607 of the shifted window cell 603 is added except the first data 606 of the previous window cell 602 so that a recursive cell average is calculated.

The exemplary embodiment will be described with reference to FIG. 4 again.

In FIG. 4, the left section 407 is located too left to have a constant window cell and the right section 408 is located too right to have a constant window cell so that the recursive modified cell average-constant false alarm rate data is stored through a method illustrated in FIG. 5.

FIG. 5 is an exemplary embodiment of a method which stores the recursive modified cell average-constant false alarm rate data for the left section 407 and the right section 408.

Referring to FIG. 5, when some or all values of the left window cell are not provided 501, the detector determines a window size 502 excluding a left value which is not present and when some or all values of the right window cell are not provided 503, determines a window size 504 excluding a right window value which is not present. The detector stores the right k-th value 303 and a minimum value of the additional k-th values 304 for the signal 302 which does not have a left k value.

FIG. 7 is a block diagram schematically illustrating an internal configuration of a vehicle to which a recursive modified cell average-constant false alarm rate detector according to an exemplary embodiment of the present invention is applied.

A vehicle 700 includes a vehicle radar 710 which includes a signal transceiving unit 711, a detecting unit 712, and a tracing unit 713 and a driving control unit 720.

The signal transceiving unit 711 includes an antenna and transmits and receives a radar signal using the antenna.

The detecting unit 710 includes a recursive modified cell average-constant false alarm rate algorithm and detects a target in accordance with the algorithm.

The tracing unit 713 traces a detected target.

The driving control unit 714 controls to drive the vehicle based on the traced target.

The recursive modified cell average-constant false alarm rate detector has been described above with reference to FIGS. 1 to 7. Hereinafter, an exemplary embodiment of the present invention which may be deducted from the exemplary embodiment will be described below. FIG. 8 is a block diagram schematically illustrating a target detecting apparatus using a radar according to an exemplary embodiment of the present invention.

Referring to FIG. 8, a target detecting apparatus 800 includes a data selecting unit 810, a cell average calculating unit 820, a CFAR data detecting unit 830, a target detecting unit 840, a power source 850, and a main control unit 860.

The target detecting apparatus 800 according to the exemplary embodiment of the present invention will be mounted in a vehicle.

The data selecting unit 810 compares reference data with at least one of previous data and subsequent data which are located at both sides of the reference data, from a received signal including information on a distance and a speed for multiple targets as a signal received through a radar, to select specific data. In the above description, the previous data refers to data which is located at the left of the reference data and the subsequent data refers to data which is located at the right of the reference data.

In this case, the data selecting unit 810 may select data having a minimum value as the specific data.

When the reference data is located at the top so that there is no previous data to the reference data, the data selecting unit 810 may compare the reference data with at least one of subsequent data to select specific data. Further, when the reference data is located at the bottom so that there is no subsequent data to the reference data, the data selecting unit 810 may compare the reference data with at least one of subsequent data to select specific data. Further, when there are the previous data and the subsequent data to the reference data, the data selecting unit 810 may compare the reference data with the previous data and the subsequent data to select specific data.

The data selecting unit 810 is the same concept as the steps 101 and 102 of FIG. 1.

The cell average calculating unit 820 calculates an average of cells extracted using a sliding window including specific data.

The cell average calculating unit 820 may calculate an average of the cells extracted in accordance with the shift of the sliding window.

The cell average calculating unit 820 is the same concept as the step 103 of FIG. 1.

The CFAR data detecting unit 830 detects constant false alarm rate data based on the average of the extracted cells by the cell average calculating unit 820.

The CFAR data detecting unit 830 may multiply the average the extracted cells by the cell average calculating unit 820 by a predetermined factor to detect the constant false alarm rate data.

The CFAR data detecting unit 830 is the same concept as steps 104 and 105 of FIG. 1.

The target detecting unit 840 detects a target based on the CFAR data.

The target detecting unit 840 may detect multiple targets using a vehicle radar in a cluttered environment.

The target detecting apparatus 800 may further include a cell size determining unit 870.

The cell size determining unit 870 determines a size of a cell including at least one of the previous data and the subsequent data and the reference data in accordance with a position of the sliding window (that is, a position at which the sliding window is located among the top, the middle, and the bottom of the received signal).

Next, an operating method of the target detecting apparatus 800 will be described. FIG. 9 is a flowchart schematically illustrating a target detecting method using a radar according to an exemplary embodiment of the present invention. Hereinafter, the exemplary embodiment will be described with reference to FIGS. 8 and 9.

First, the data selecting unit 810 compares reference data with at least one of previous data and subsequent data which are located at both sides of the reference data, from a received signal including information on a distance and a speed for multiple targets as a signal received through a radar, to select specific data in step S910.

Next, the cell average calculating unit 820 calculates an average of cells extracted using a sliding window including specific data in step S920.

Next, the CFAR data detecting unit 830 detects constant false alarm rate data based on the average of the extracted cells in step S930.

Next, the target detecting unit 840 detects a target based on the CFAR data in step S940.

In the meantime, between the steps S910 and 920, the cell size determining unit 870 may determine a size of the cell in accordance with the position of the sliding window.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A target detecting apparatus using a radar, the apparatus comprising:
    a data selecting unit which selects specific data by comparing a first value of reference data with one or both of a second value of previous data and a third value of subsequent data, the previous data and the subsequent data being located at first and second sides of the reference data, respectively, a received signal including the previous data, the reference data, and the subsequent data, the received signal indicating information on a distance and a speed for one or more targets;
    a cell average calculating unit which calculates an average value of extracted cells using a sliding window including the specific data;
    a constant false alarm rate (CFAR) data detecting unit which detects CFAR data based on the average value of the extracted cells; and
    a target detecting unit which detects the one or more targets based on the CFAR data.

2. The apparatus of claim 1, wherein the data selecting unit selects one of the compared data having a minimum value as the specific data.

3. The apparatus of claim 1, wherein the previous data is first previous data and the subsequent data is first subsequent data, and the received signal further includes second previous data and second subsequent data, the second previous data being located at the first side of the reference data and farther than the first previous data from the reference data, the second subsequent data being located at the second side of the reference data and farther than the first subsequent data from the reference data,
    wherein when the first previous data is not available in comparing the first value of the reference data, the data selecting unit compares the first value of the reference data with one or both of the third value of the first subsequent data and a fourth value of the second subsequent data to select the specific data,
    wherein when the first subsequent data is not available in comparing the first value of the reference data, the data selecting unit compares the first value of the reference data with one or both of the second value of the first previous data and a fifth value of the second previous data to select the specific data, and
    wherein when the first previous data and the first subsequent data are available in comparing the first value of the reference data, the data selecting unit compares the first value of the reference data, the second value of the first previous data, and the third value of the first subsequent data to select the specific data.

4. The apparatus of claim 1, wherein the cell average calculating unit calculates the average value of the extracted cells in accordance with a shift of the sliding window.

5. The apparatus of claim 1, further comprising:
    a cell size determining unit which determines a size of a cell, the cell including the reference data and the one or both of the previous data and the subsequent data in accordance with a position of the sliding window.

6. The apparatus of claim 1, wherein the CFAR data detecting unit multiplies the average value of the extracted cells by a predetermined factor to detect the CFAR data.

7. The apparatus of claim 1, wherein the target detecting unit detects the one or more targets using a vehicle radar in a cluttered environment.

8. The apparatus of claim 1, wherein the target detecting apparatus is mounted in a vehicle.

9. A target detecting method using a radar, the method comprising:

selecting specific data by comparing a first value of reference data with one or both of a second value of previous data and a third value of subsequent data, the previous data and the subsequent data being located at first and second sides of the reference data, respectively, a received signal including the previous data, the reference data, and the subsequent data and indicating information on a distance and a speed for one or more targets;

calculating an average value of extracted cells using a sliding window including the specific data;

detecting constant false alarm rate (CFAR) data based on the average value of the extracted cells; and detecting the one or more targets based on the CFAR data.

10. The method of claim 9, wherein in the selecting, one of the compared data having a minimum value is selected as the specific data.

11. The method of claim 9, wherein the previous data is first previous data and the subsequent data is first subsequent data, and the received signal further includes second previous data and second subsequent data, the second previous data being located at the first side of the reference data and farther than the first previous data from the reference data, the second subsequent data being located at the second side of the reference data and farther than the first subsequent data from the reference data, wherein in selecting the specific data, when the first previous data is not available, the first value of the reference data is compared with one or both of the third value of the first subsequent data and a fourth value of the second subsequent data to select the specific data, wherein in selecting the specific data, when the first subsequent data is not available, the first value of the reference data is compared with one or both of the second value of the first previous data and a fifth value of the second previous data to select the specific data, and wherein in selecting the specific data, when the first previous data and the first subsequent data are available, the first value of the reference data, the second value of the first previous data, and the third value of the first subsequent data are compared to select the specific data.

12. The method of claim 9, wherein in the calculating, the average value of the extracted cells is calculated in accordance with a shift of the sliding window.

13. The method of claim 9, further comprising:

determining a size of a cell which includes the reference data and the one or both of the previous data and the subsequent data in accordance with a position of the sliding window.

14. The method of claim 9, wherein in detecting the CFAR data, the average value of the extracted cells is multiplied by a predetermined factor to detect the CFAR data.

15. The method of claim 9, wherein in detecting the one or more targets, the one or more targets are detected using a vehicle radar in a cluttered environment.

16. The apparatus of claim 1, wherein each of the first value of the reference data, the second value of the previous data, and the third value of the subsequent data is a single value.

* * * * *